No. 755,640. PATENTED MAR. 29, 1904.
H. R. DRAKE.
EGG TRAY.
APPLICATION FILED DEC. 23, 1903.
NO MODEL. 2 SHEETS—SHEET 1.

Attest:
M. B. Smith.
J. C. Culver.

Inventor:
Harry R. Drake.
By E. B. Whitmon, Atty.

No. 755,640. PATENTED MAR. 29, 1904.
H. R. DRAKE.
EGG TRAY.
APPLICATION FILED DEC. 23, 1903.
NO MODEL. 2 SHEETS—SHEET 2.
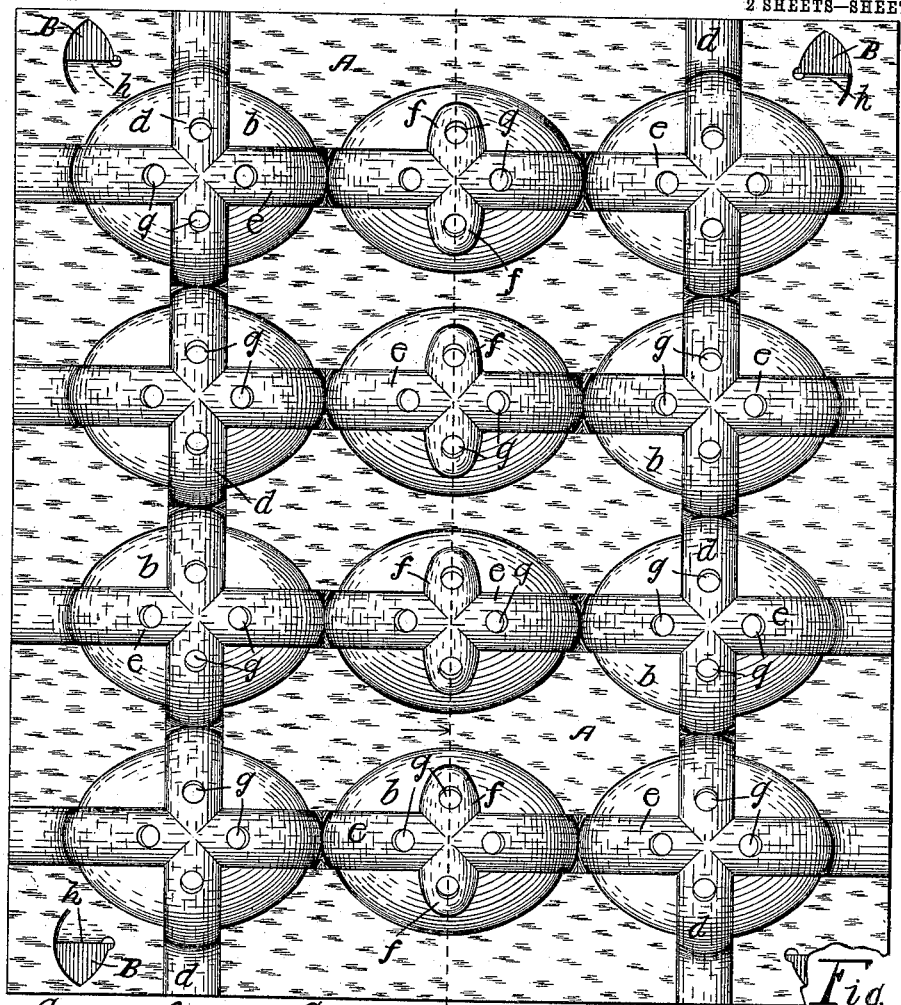
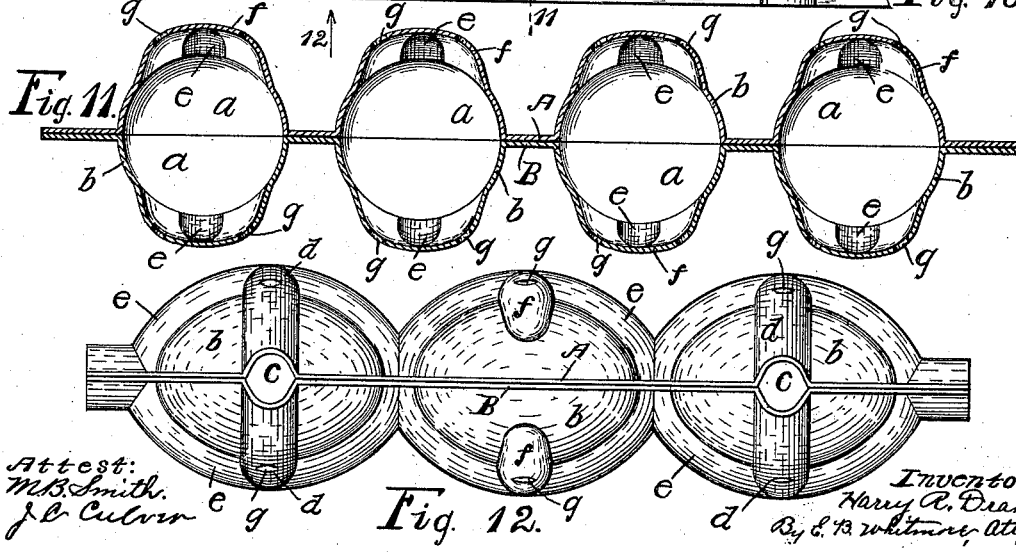

No. 755,640.                                    Patented March 29, 1904.

UNITED STATES PATENT OFFICE.

HARRY R. DRAKE, OF NEWARK, NEW YORK, ASSIGNOR TO INTERNATIONAL EGG-CARRIER AND PAPER COMPANY, OF NEWARK, NEW YORK.

EGG-TRAY.

SPECIFICATION forming part of Letters Patent No. 755,640, dated March 29, 1904.

Application filed December 23, 1903. Serial No. 186,369. (No model.)

*To all whom it may concern:*

Be it known that I, HARRY R. DRAKE, of Newark, in the county of Wayne and State of New York, have invented a new and useful Improvement in Egg-Trays, which improvement is fully set forth in the following specification and shown in the accompanying drawings.

My invention is an improved egg-tray or device for receiving and holding a small number of eggs, as a dozen, more or less. This tray is to be used both for handling the eggs in small lots and for safely packing them in boxes or crates for shipping and also for quickly and conveniently candling the eggs before or after packing in the crates.

Similar devices for holding eggs are shown in Patents No. 469,114, dated February 16, 1892, and No. 545,567, of September 3, 1895, my invention being an improvement on the devices shown and set forth in both said Letters Patent.

It has been found in practice that eggs packed in crates or boxes for storage or for shipment keep better when the shells are well and amply supplied with currents of air moving over them; and one main object of my invention is to provide better means for ventilation for the eggs while closely packed in the trays.

Another object of my invention is to provide means for better protecting the eggs against breakage while in the trays and also means for candling the eggs while in the trays without impairing or lessening the means employed for protecting or cushioning the eggs.

A further object of my invention is to provide a cheap and convenient means for locking the parts of the tray together after being filled with the eggs.

Other objects and advantages of the invention will be brought out and made to appear in the following description, and particularly pointed out in the appended claims, reference being had in this specification to the accompanying drawings, forming a part thereof.

Figure 1:
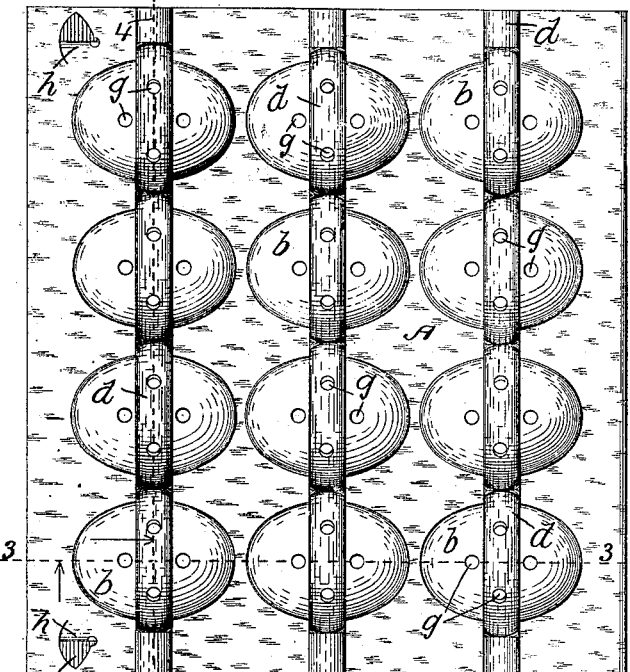
Figure 2:
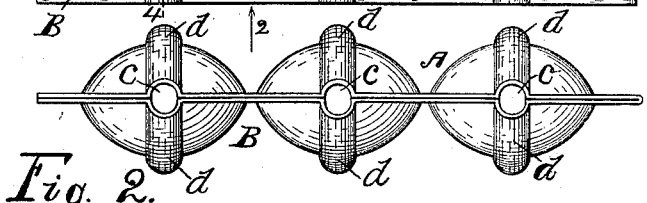
Figures 3, 4, 9:
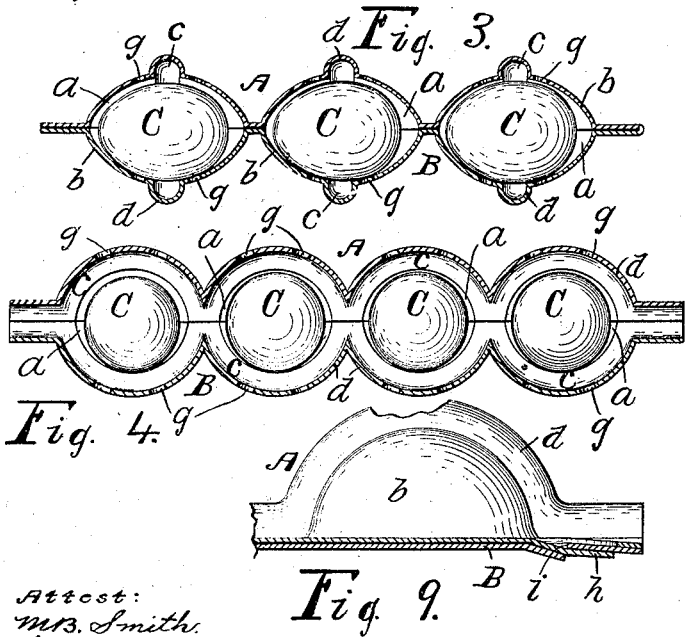
Figure 5:
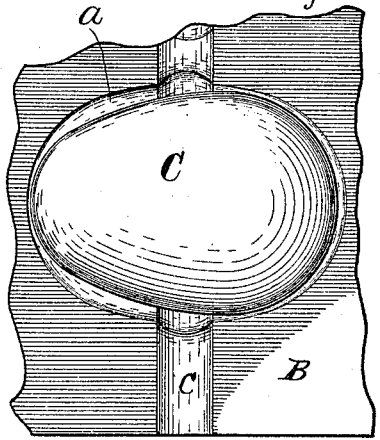
Figure 6:
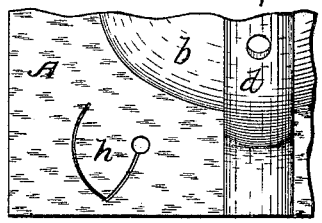
Figure 7:
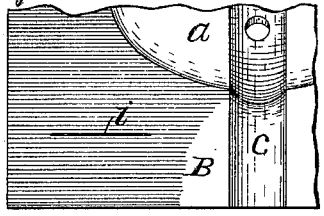
Figure 8:
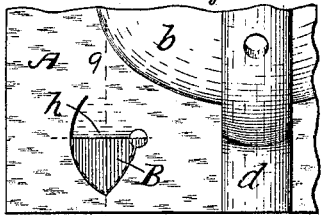

Figure 1 is a plan of my improved egg-tray closed as ready for packing. Fig. 2 is an edge view of the same seen as indicated by arrow 2 in Fig. 1. Fig. 3 is a longitudinal section of the tray on the dotted line 3 3 in Fig. 1. Fig. 4 is a transverse section on the dotted line 4 4 in Fig. 1. Fig. 5 is a view of a part of the inner face of one of the tray-sections, showing a cavity occupied by an egg. Fig. 6 is a plan at one corner of the upper section of the tray, showing a locking-tongue. Fig. 7 is a plan of a part at one corner of the lower section, showing a locking slit or kerf.
Fig. 8 is a plan at one corner of the tray, showing the sections locked together. Fig. 9 is a vertical section of a part of the tray, taken on the dotted line 9 in Fig. 8, showing the parts locked. Fig. 10, drawn to a larger scale, shows a modification in the form of the cushioning ribs of the tray. Fig. 11 is a vertical section on the dotted line 11 in Fig. 10. Fig. 12 is an edge view of the tray seen as indicated by arrow 12 in Fig. 10.

In the drawings, A is the upper section of the tray, and B the lower section, both rectangular in form and alike and usually made of cheap coarse strawboard pressed to shape while wet and pliable in suitably-formed molds. These sections are each formed with a series of ovate cavities or depressions $a$, (shown in various figures,) arranged regularly in cross-rows, so that when the sections are put together one upon another, as shown, the cavities fall opposite one another in pairs, two together forming an ovoidal chamber or cell $b$, in which to receive an egg C, as shown. The sections A B are also formed with transverse channels $c$, crossing the rows of cavities $a$ and extending from edge to edge of the tray and opening out at their ends at both edges, as shown. These channels arch over and open into both sides of every egg-cavity $a$ in the tray and open out at both ends, thus affording passages for the free circulation of air to and around each egg when in the tray. The arched walls of the channels form convex ribs or fenders $d$ on each side of every egg,
so that the latter are cushioned and protected against injury or shocks that might be liable to crack the shells, said raised ribs traversing the cavities $a$. I also find it desirable to cross the ribs $d$ with similar hollow ribs $e$, Figs. 10, 11, and 12, these cross-ribs, like the ribs $d$, opening out full size at both edges of the sections A B of the tray and furnishing additional means for circulation of air around the eggs. This construction of the tray gives the contained eggs both increased aeration and double protection against injury from shocks resulting from long hauls, careless handling, and the like, and especially is this construction of the trays with cross-ribs or fenders desirable when they are to be used for packing eggs for long-distant shipments, during which there is increased danger of breakage.

In Figs. 10, 11, and 12 is shown also a further variation in the form of the ribs or fenders of the trays, these being made in short, separate, or disconnected raised parts $f$, crowning the egg-cavities, as shown. These short cross-ribs constitute auxiliary fenders, and they may be formed over or across every cell $b$ or not, as found desirable. They serve to reinforce and strengthen the continuous ribs crossed by them and aid in the matter of affording protection for the eggs while in the trays, whether the latter are packed in crates or used separately.

In this improved egg-tray I also form openings $g$, preferably in clusters of four, through the sections A B, leading into the interior of the egg-cells $b$. These openings are made, respectively, opposite one another and are useful both for aeration and for conveniently candling the eggs while in the trays. When the trays are made with single ribs, as shown in Fig. 1, the openings for each cell are made two through the rib and two opening directly into the cell. When the trays are formed with cross-ribs, all the openings are made through the ribs, as appears in Fig. 10. In forming these openings they are purposely made distant from the apexes or high points of the arched ribs or fenders $d\ e\ f$, which points come in contact and press one against another when the trays are piled in the crate. These points, receiving the force of the shocks and all the abrasion incident to handling and transportation, need to be firm and imperforate, so to have the full resisting strength of the material of which the tray is made. Perforations at the crowns or high points of the ribs, as have been sometimes made, materially weaken the ribs at the points where the most of the wear comes on the trays and where the greatest resistance against injury is required.

The sections A B of the tray may be made in a single piece and bend or double at the middle to bring the parts one upon another, as shown in Figs. 1, 2, and 3; but I usually prefer to make the sections separate, as shown in other figures. In either case I form the upper section with pointed tongues $h$, Fig. 6, near the corners and the lower section with slits $i$, Fig. 7, through which to pass the tongues, as shown, Fig. 9 showing the relative positions of the parts when the sections are locked together. Where the sections are in one piece, the tongues and slits are formed at the two corners of the tray opposite the hinge edge, as shown in Fig. 1. When the sections are separate, the tongues and slits are formed at all four corners, as shown in Fig. 10. The tongues at the two sides of the tray point in opposite directions, and to insert them in the slits the upper section is temporarily bent convex upward at the middle, the sections being brought fairly together face to face when the tongues are pressed home in the respective slits.

What I claim as my invention, and desire to secure by Letters Patent, is—

1. An egg-tray comprising two similar sections or main parts each formed with ovate cavities in rows, the sections being placed together face to face with the cavities one upon another, two associated cavities together constituting a cell for receiving an egg, there being continuous air passages or channels traversing the rows of cavities in each section from side to side and opening out at both ends at the sides of the tray.

2. An egg-tray comprising two similar rectangular sections each formed with cavities in rows for receiving the eggs, the sections being placed together with the cavities one upon another, two cavities constituting a cell for receiving an egg, there being air passages or channels traversing the cavities, transversely disposed, said channels extending continuously from side to side of the tray and opening out at all four sides of the latter.

3. An egg-tray comprising two similar sections each formed with ovate cavities in rows, the sections being placed together with the cavities opposite in pairs constituting cells for receiving the eggs, there being raised ribs or fenders on each section of the tray extending over said cavities in transverse directions extending entirely across the tray to the extreme opposite edges thereof.

4. A tray for holding eggs, consisting of two equal sections formed with cavities in rows and placed one upon the other, and parallel, continuous, raised, protecting-ribs traversing the cavities in one direction, and short separated ribs disposed transversely of the continuous ribs.

5. An egg-tray having two equal and similar sections or main parts, each having cavities and placed together with the cavities registering and two together forming an ovoidal cell for receiving an egg, there being raised protecting-ribs on each section over the cells, and perforations, through each section and through said ribs, leading to the cells.

In witness whereof I have hereunto set my hand, this 14th day of December, 1903, in the presence of two subscribing witnesses.

HARRY R. DRAKE.

Witnesses:
  PETER R. SLEIGHT,
  E. E. GENTHNER.